M. F. WILDAU.
VEHICLE TOP.
APPLICATION FILED FEB. 7, 1916.
1,225,384.
Patented May 8, 1917.
3 SHEETS—SHEET 1.
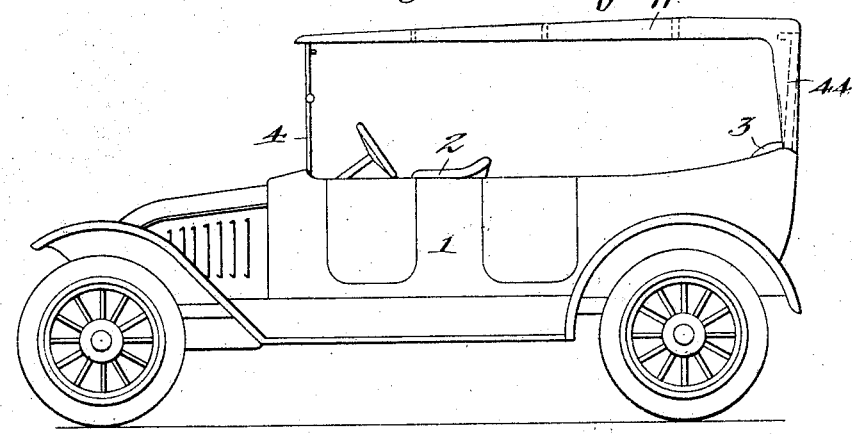
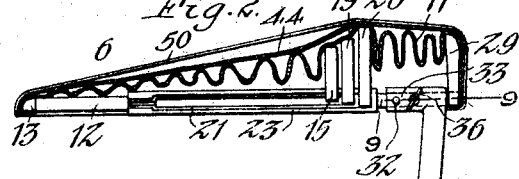
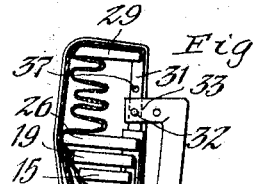
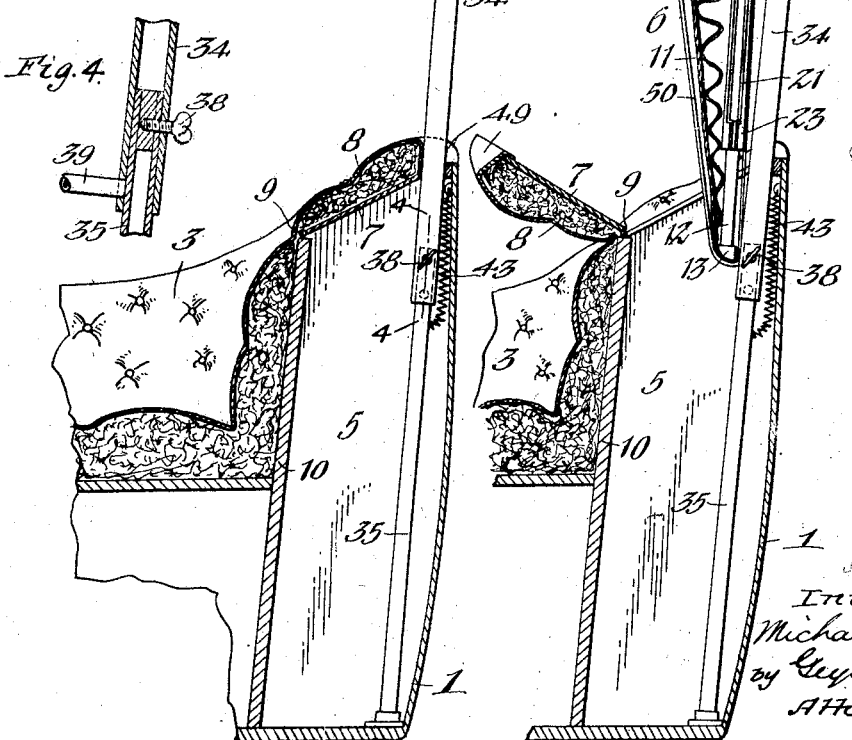
Inventor
Michael F. Wildau
by Geyer & Popp
Attorneys M. F. WILDAU.
VEHICLE TOP.
APPLICATION FILED FEB. 7, 1916.
1,225,384.
Patented May 8, 1917.
3 SHEETS—SHEET 2.
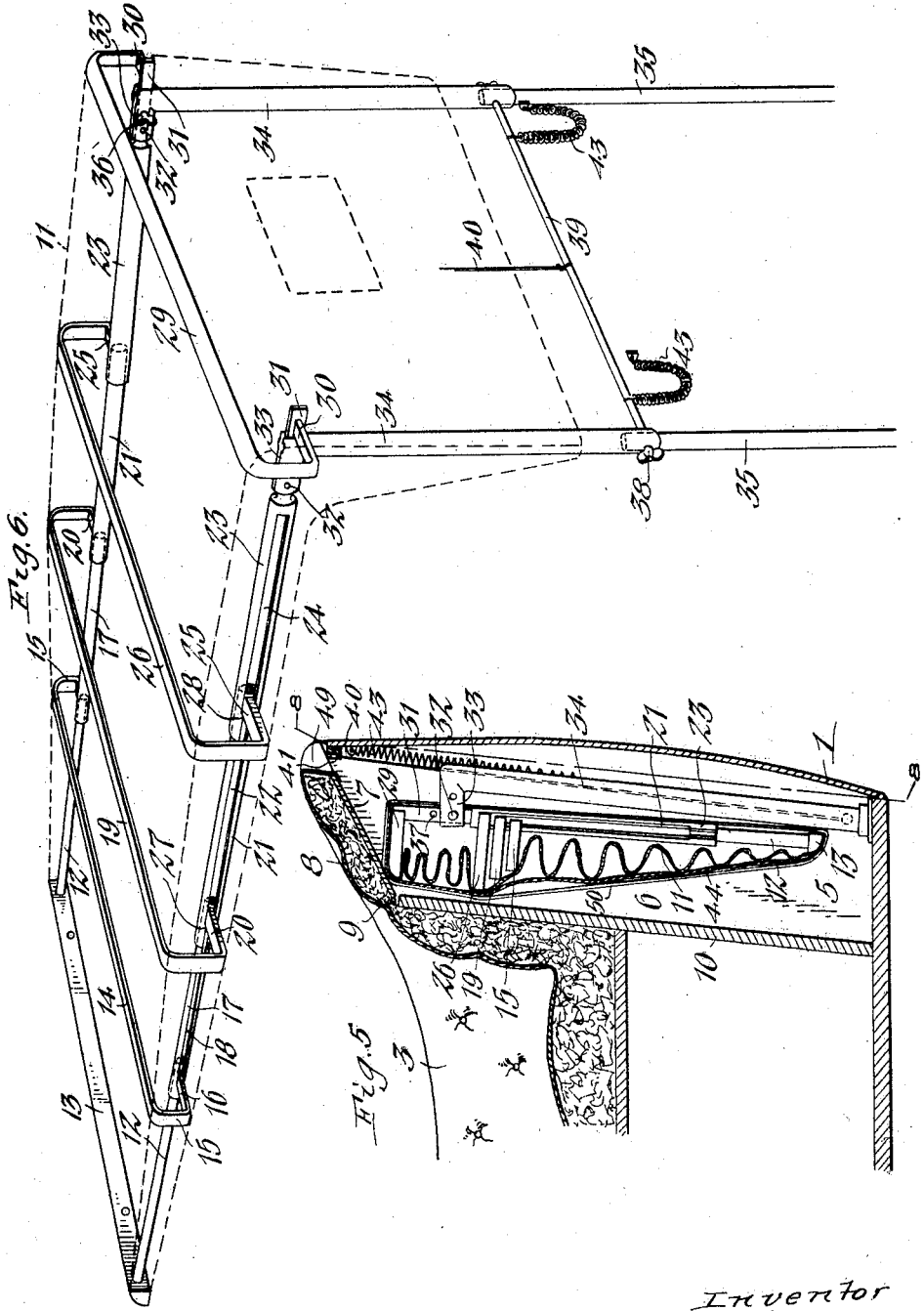
Inventor
Michael F. Wildau,
by Geyer Popp
Attorneys M. F. WILDAU.
VEHICLE TOP.
APPLICATION FILED FEB. 7, 1916.
1,225,384.
Patented May 8, 1917.
3 SHEETS—SHEET 3.
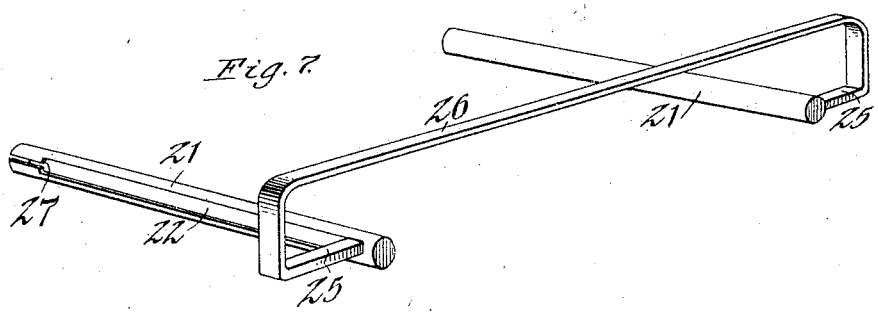
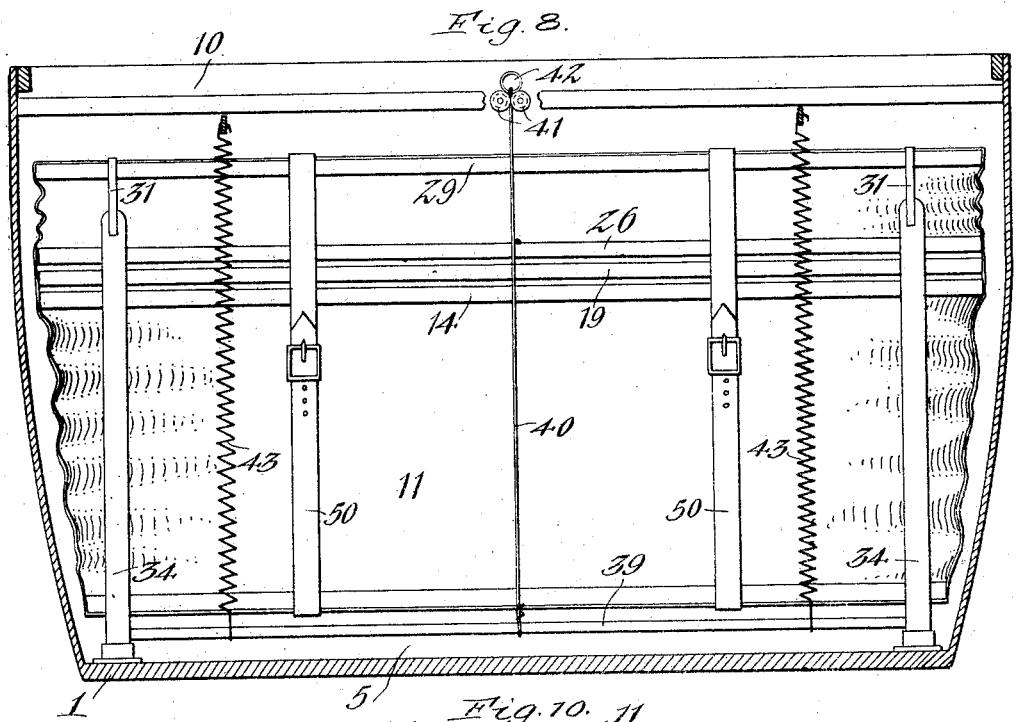
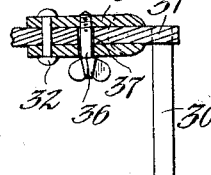
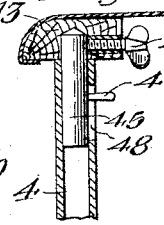
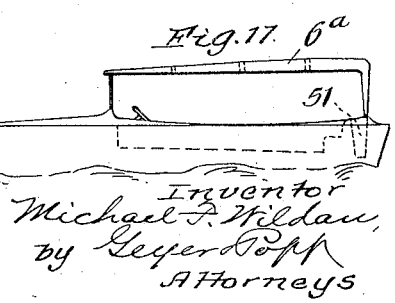
Inventor
Michael F. Wildau,
by Geyer & Popp
Attorneys

UNITED STATES PATENT OFFICE.

MICHAEL F. WILDAU, OF BUFFALO, NEW YORK.

VEHICLE-TOP.

1,225,384.  Specification of Letters Patent.  Patented May 8, 1917.

Application filed February 7, 1916. Serial No. 76,500.

*To all whom it may concern:*

Be it known that I, MICHAEL F. WILDAU, a citizen of the United States, residing at Buffalo, in the county of Erie and State of New York, have invented new and useful Improvements in Vehicle-Tops, of which the following is a specification.

In endeavoring to meet the growing demand for beauty and simplicity in the design of automobile bodies, manufacturers have produced the so-called "stream-line" cars now in general use. Designers have however been handicapped by the presence of the customary top which, when folded, lacks the desired neatness and detracts from the otherwise sightly lines of the body.

The main object of my invention is the provision of a disappearing top for automobiles and other vehicles which is completely hidden from view when not in use, thus rendering the car as neat and attractive as one having no top of any kind.

A further object is to construct the top that, while remaining attached to the body, it can be conveniently folded and unfolded by one person.

Another object is the provision of a top of this character which shall be strong and rigid in construction and which can be produced at reasonably low cost.

In the accompanying drawings:

Figure 1 is a side elevation of a touring car equipped with the improved top, showing the latter unfolded. Fig. 2 is a vertical longitudinal section, on an enlarged scale, of the rear portion of the car, showing the top telescoped preparatory to folding and lowering it into the pocket of the automobile body. Fig. 3 is a view similar to Fig. 2, showing the top telescoped and folded preparatory to lowering it out of view. Fig. 4 is an enlarged longitudinal section on line 4—4, Fig. 2. Fig. 5 is a view similar to Fig. 3, showing the top lowered and concealed in the automobile pocket. Fig. 6 is a perspective view of the frame of the top and its rear supports. Fig. 7 is a perspective view of one of the telescopic frame-sections of the top. Fig. 8 is a transverse section on line 8—8, Fig. 5. Fig. 9 is an enlarged horizontal section on line 9—9, Fig. 2. Fig. 10 is an enlarged vertical section of one of the devices for locking the top to the windshield frame. Fig. 11 is a side elevation of a motor-boat provided with the top.

Similar characters of reference indicate corresponding parts throughout the several views.

Referring to Figs. 1–10, the body of the automobile has the usual front seat 2, rear seat 3 and the customary upright stationary frame or support 4 for the wind shield. The body is of ordinary construction except that in the case of a touring car it is provided behind the rear seat with an upright pocket or compartment 5 of suitable dimensions to receive and conceal the improved top which is generally designated by the reference numeral 6. This pocket is normally closed at its top by a lid or cover 7 which is preferably upholstered, as shown at 8, to form a continuation of the back-rest of the rear seat, as best illustrated in Figs. 2 and 5. In the construction shown, the front edge of the cover is connected by a hinge 9 to the top of the partition 10 forming the front wall of the pocket 5 and the rigid back of the rear seat.

The top can be collapsed and folded in this manner without disturbing the covering 11, which may therefore be permanently secured to the bows of its frame as hereinbefore described, thus permitting the top to be readily and conveniently lowered.

The top 6 is collapsible or telescopic and comprises a covering 11 of leather or other suitable material applied to a frame which is composed of a suitable number of sections constructed to telescope lengthwise of the vehicle. In the preferred construction shown in the drawings, the foremost section of this frame consists of a pair of parallel longitudinal rods or tubes 12 rigidly connected together at their front ends by a cross bar 13 and at their rear ends by a bow or arch 14 raised above the level of said side rods and having its vertical end portions 15 provided with horizontal inwardly-extending arms 16 which are rigidly secured to the rods. These rods telescope into a pair of tubes 17 forming the side-members of the next section of the top and provided in their outer sides with longitudinal slots 18 through which the arms 16 pass and in which they slide in contracting and extending the top. Carried by the rear ends of the tubes 17 and rigidly secured thereto is a second bow 19 provided with inturned-arms 20. The tubes 17 telescope into similar tubes 21 forming the side members of the 1 next section of the telescopic frame and having longitudinal slots 22 for the passage of the arms 20. The tubes 21 in turn telescope into the side tubes 23 of the rearmost section which are provided with longitudinal slots 24 through which pass the inturned arms 25 of the third bow 26, which is fastened to the rear ends of the telescopic tubes 21. The slots of the tubes 17 terminate short of their front ends to form stops or shoulders which prevent complete withdrawal of the foremost rods or members 12 from said tubes. The slots of the succeeding tubes 21 and 23 extend to the extreme front ends thereof to permit the arms 16 and 20 of the bows 14 and 19 to pass from end to end of the tubes 21 and to enter the slots 24 of the rearmost tubes 23 in completely telescoping the frame-sections of the top, as shown in Figs. 2, 3 and 5. To prevent complete withdrawal of the second and third pairs of tubes 17 and 21 from their respective supporting tubes, the slots of the tubes 21 and 23 are contracted near their front ends to form stops or shoulders 27, 28 against which the arms of the bows 19 and 26 are adapted to abut, as shown in Fig. 6. To permit this contraction of the sections and at the same time prevent their disconnection when extended, the arms of the several bows are progressively thicker from the front toward the rear end of the top, and the uncontracted portions of the slots of the telescopic tubes are progressively wider to fit said arms.

On the rear ends of the largest tubes 23 is mounted the rearmost bow 29 of the top-frame, its inturned arms 30 being secured to flattened rearward extensions 31 of said tubes. As shown, the several bows or arches, except the rearmost one, are progressively higher from the front toward the rear of the top, while the rearmost bow 29 is somewhat lower than the highest one 26, to give the top the usual forward and backward slope, as shown in Fig. 1 and by dotted lines in Fig. 6.

At its rear end, the telescopic top is pivotally supported upon suitable standards or uprights in such manner that after being telescoped, it may be swung into a pendent position and lowered into the pocket 5. In the preferred construction shown in the drawings, the flattened rear portions 31 of the tubes 23 are hinged by transverse pins or rivets 32 to forked arms or brackets 33 extending forwardly from vertically-movable tubes 34 which are telescopically mounted on tubular posts or upright guides 35 arranged in the rear portion of the pocket 5 and firmly secured to the bottom thereof, so that the tubes 34 may be elevated or extended to the normal position shown in Figs. 2 and 3, or lowered into the pocket, as shown in Fig. 5. The vertically-swinging tubes 23 may be locked in their normal horizontal position by any suitable means, those shown in the drawings consisting of thumb screws or bolts 36 passing through the brackets 33 and openings 37 formed in the extensions 31, as shown in Fig. 9. Suitable means are provided for retaining the upright tubes 34 in their elevated position, the devices shown in the drawings consisting of thumb screws 38 passing through the lower portions of said tubes and engaging threaded openings formed in plugs brazed in the upper ends of the posts 35, as illustrated in Fig. 4.

The posts 35 terminate a suitable distance below the upper end of the pocket 5 and the top is made of such dimensions that when collapsed and folded, it completely enters the pocket, as shown in Fig. 5.

Means are also provided for conveniently withdrawing the vertically-sliding tubes 34 and the folded top from the pocket 5. For this purpose the lower portions of these tubes are preferably connected by a transverse rod 39 to which is attached a flexible lifting cord or chain 40 having its upper portion guided between a pair of anti-friction rollers 41 journaled on the rear wall of the pocket near its top, as shown in Figs. 5 and 8. The upper end of this cord terminates in a ring or other handle 42. To cushion the downward movement of the tubes 34 and the folded top, springs 43 are preferably employed. They are attached at one end to the cross rod 39 and at their other ends to the back of the pocket 5. These springs are distended when the folded top is lowered into the pocket, as shown in Fig. 8, and therefore serve also to assist the operator in raising the top out of the pocket.

The covering 11 of the top may be provided at its rear end with the customary downward extension or curtain 44. The covering may be secured to its frame by any suitable means; I prefer to fasten it permanently to the cross bar 13 and the rear bow 29.

When the top is extended, its front end is preferably supported upon the posts of the wind shield-frame 4 to which it is detachably secured by any suitable means. For this purpose, the posts of said frame may be provided in their upper ends with vertically-sliding locking bolts 45 which enter sockets in the front cross bar 13 of the top-frame, as shown in Fig. 10, these bolts being clamped in their locked position by thumb screws 46. The bolts are provided with operating pins 47 which pass through vertical slots 48 in said posts.

In the normal extended position of the top, shown in Fig. 1, its front portion is supported upon the wind-shield frame as just described, and its rear portion is supported upon the standards formed by the posts 35 and the extended tubular members 34, while the cover 7 of the pocket is closed. In order to clear these standards, the cover is provided in its rear edge with notches or recesses 49 which receive them. When it is desired to lower and conceal the top, its front end is detached from the shield-frame 4 by loosening the screws 46 and withdrawing the bolts 45, after which the top is collapsed to the position shown in Fig. 2, by pushing its front bar 13 rearwardly. The curtain 44 is next folded forwardly over the top and the parts are fastened in this position preferably by a pair of straps 50 or other suitable means. The clamping bolts 36 are then withdrawn to allow the collapsed top to swing down to the folded position shown in Fig. 3, after which the clamping bolts 38 of the telescopic standards are likewise unscrewed, allowing the tubes 34 and the folded top to descend into the pocket 5, as shown in Figs. 5 and 8, and finally the cover 7 is closed. In this position, the top is completely concealed and the car presents the appearance of one without a top. There are therefore no unsightly parts at the sides and back of the car body, such as presented by the ordinary top, when folded, giving the body a very neat and attractive appearance.

To unfold the top, the cover 7 is opened, the top is withdrawn from the pocket and the raised tubes 34 are clamped in position by means of the screws 38, after which the straps 50 are removed and the top is swung to the horizontal position shown in Fig. 2 and extended and fastened to the wind shield frame, as hereinbefore described. Its rear portion is firmly secured in this unfolded position by replacing the clamping screws 36. These operations can be quickly and conveniently performed by one person.

In the unfolded and extended position of the top, the vacant pocket 5 may be used for storing various articles, such as the side curtains of the car, blankets, rain-coats, tires, the wind-shield, etc.

Obviously, the top may be provided with a greater or less number of telescopic sections according to the length and type of the vehicle. When applied to a runabout, the front and rear sections may be sufficient.

As shown in Figs. 6 and 8, the front cross bar 13 is somewhat shorter than the foremost bow 14 of the top-frame. By this construction the front portion of the collapsible top gradually narrows toward its front end, as best shown in Fig. 8, producing a more graceful effect than a top which is of uniform width from end to end. This forwardly tapering form enables the top to be made of the desired width as a whole and yet permits its entrance into the pocket 5 which follows the customary downwardly-tapering form of the automobile body and is thus correspondingly contracted at its lower end.

The standards 34 are located adjacent to the side walls of the downwardly-tapering pocket and while the telescopic side-members of the top are in line with the standards and set in from said walls, the bows 14, 19 and 26 extend laterally beyond the side-members nearly to said walls, thus obtaining a top substantially as wide as the vehicle-body when raised, and yet capable of entering the pocket, when lowered.

This improved top is applicable not only to automobiles of various kinds, but to other vehicles and conveyances, including motor boats. An example of this kind is shown in Fig. 11 where a top 6ª identical in construction with that shown in Figs. 1–10 is applied to a motor-boat which is provided in its stern with a pocket or compartment 51 for receiving and concealing the folded top. The term "vehicle-body" used in the claims is intended to cover motor-boats as well as motor-cars.

Various modifications, coming within the scope of the appended claims, may be made by those skilled in the art without departing from the spirit of the invention, and I do not therefore wish to be limited to the particular construction herein shown and described.

I claim as my invention:

1. The combination of a vehicle-body having a transverse pocket which is narrower in its lower than in its upper portion, vertically-movable supports arranged in said pocket, a collapsible and foldable top-frame pivoted to said supports and adapted to enter said pocket, said frame narrowing toward its front end to conform to the lower portion of said pocket, and a flexible covering applied to said frame.

2. The combination with a vehicle-body having a pocket extending from side to side thereof and made narrower in its lower than in its upper portion, of telescopic standards secured within said pocket adjacent to its side walls, and a collapsible and foldable top adapted to enter said pocket, said top having a frame comprising telescopic vertically-swinging side-members pivoted at their rear portions to the upper ends of said standards and transverse bows each carried by a pair of opposing sections of said side-members and extending laterally beyond the same nearly to the side walls of said pocket in the folded position of the top, the front portion of said top-frame being narrower than its rear portion to conform to the lower portion of said pocket.

3. The combination of a vehicle-body having a pocket, telescopic standards arranged in said pocket, a cross-bar connecting the upper movable members of said standards, guide-pulleys journaled on the rear wall of said pocket, a lifting cord attached to said cross-bar and engaging said pulleys, and cushioning springs attached at their lower ends to said cross-bar and at their upper ends to the wall of said pocket.

4. A vehicle-top having a frame comprising telescopic side-members provided with longitudinal slots and transverse bows extending beyond said members and each having inwardly-extending arms secured to a pair of said side-members and normally arranged in the slots of the next adjacent side-members.

5. A vehicle-top having a frame comprising telescopic side-members provided with longitudinal slots and transverse bows each having its end-portions secured to a pair of said side-members and normally arranged in the slots of the adjacent side-members, the slots of the foremost pair of side-members terminating short of their front ends, while the slots of the remaining side-members extend to their front ends and are constructed to admit the end-portions of the preceding bows.

6. A vehicle top having a frame comprising telescopic side-members provided with longitudinal slots and transverse bows each having its end-portions secured to a pair of said side-members and normally arranged in the slots of the adjacent side-members, the slots of the side-members, except those of the foremost pair, extending to the front ends of the members and being contracted at those ends, forming stop-shoulders for the end-portions of the companion bows.

7. A vehicle-top having a frame comprising telescopic side-members provided with longitudinal slots and transverse bows each having inturned arms secured to a pair of said side members and normally arranged in the slots of the adjacent side-members, the arms of said bows being progressively thicker from the front toward the rear of said frame, the slots of each pair of side members, except those of the foremost ones, extending to the front ends of the members and being contracted at their front ends, forming stops, the contracted portions of the slots of each pair being wide enough to admit the arms of the preceding bows but narrower than the thickness of the arms on their companion bow to prevent complete withdrawal of the arms from the slots.

MICHAEL F. WILDAU.